United States Patent [19]

Willey

[11] 3,898,190

[45] Aug. 5, 1975

[54] ANTIFOULING MARINE COATING COMPOSITION

[75] Inventor: Monroe M. Willey, Media, Pa.

[73] Assignee: E. I. du Pont de Nemours & Co., Wilmington, Del.

[22] Filed: Mar. 11, 1974

[21] Appl. No.: 449,986

[52] U.S. Cl. .................. 260/27 R; 106/67; 106/36; 106/218; 106/219; 106/224; 106/228; 106/243; 106/244; 106/253; 106/272; 106/281; 260/23 H; 260/737
[51] Int. Cl. ........................... C08d 9/12; C09j 3/26
[58] Field of Search................ 260/27 R, 23 H, 737

[56] References Cited
UNITED STATES PATENTS

| | | | |
|---|---|---|---|
| 2,556,145 | 6/1951 | Niederhauser | 260/23.7 N |
| 2,882,252 | 4/1959 | Stefanik | 260/27 R |
| 2,927,091 | 3/1960 | Liggett | 260/27 R |
| 3,033,809 | 5/1962 | Saroyan | 260/27 R |
| 3,236,793 | 2/1966 | Robins | 260/27 R |
| 3,274,137 | 9/1966 | Saroyan | 260/27 R |
| 3,794,501 | 2/1974 | De Nio | 260/27 R |

*Primary Examiner*—Melvyn I. Marquis
*Assistant Examiner*—William E. Parker

[57] ABSTRACT

The coating composition is used to protect substrates subjected to under water conditions from fouling of all types of marine growth; one typical use is to protect ships' bottoms, piers, under water pipes, and other structures subjected to sea water; the composition contains a binder of a chlorinated hydrocarbon rubber, having a specific chlorine content and viscosity;

rosin which is at least partially soluble in sea water such as rosin of a grade of WW or WG; and optionally, a plasticizer, such as tricresyl phosphate, chlorinated paraffins, or phthalate esters; and the composition contains a novel combination of pigments of cuprous oxide and calcium carbonate which significantly improves the antifouling characteristics of the resulting coating.

8 Claims, No Drawings

ANTIFOULING MARINE COATING COMPOSITION

BACKGROUND OF THE INVENTION

This invention is directed to a coating composition that eliminates the fouling of marine organisms on substrates which are exposed to sea water.

It is well known that the bottom of boats and ships are subjected to the growth of marine organisms, such as barnacles and algae. When these organisms attach to the ship's hull, it slows the vessel considerably and can increase fuel consumption by as much as 40%. Antifouling coatings have been applied to the bottom of boats and ships to prevent these marine growths but these coatings often fail after relatively short periods of time and then the ship has to be taken out of service, placed in dry dock and the hull scraped, sanded and repainted. A low cost coating composition which would increase the time a ship can stay in service before dry docking and refinishing of the ship's bottom would permit a significant economic advantage.

The novel coating composition of this invention is economical since it uses substantially less cuprous oxide than conventional compositions, reduces pollution since less toxic pigment is present in the composition and increases the in-service time of ships in comparison to conventionally available antifouling coating compositions.

SUMMARY OF THE INVENTION

The novel coating composition of this invention has a binder and pigment solids content of about 30 to 90 percent by weight and a corresponding solvent content of about 10 to 70 percent by weight;
  wherein the binder consists essentially of
  1. 10–70 percent by weight, based on the weight of the binder, of a chlorinated hydrocarbon rubber, having a 50 to 75 percent chlorine content and a viscosity of 4 to 50 centipoises determined at 25°C. using a 20 percent solids solution in toluene;
  2. 30–90 percent by weight, based on the weight of the binder, of rosin that is at least partially soluble in sea water; and
  3. 0–20 percent by weight, based on the weight of the binder, of a plasticizer which is either tricresyl phosphate, a chlorinated paraffin or a phthalate ester; and wherein the pigments are in a pigment volume concentration of 35–55% and consist essentially of
  1. 30–90 percent by volume, based on the total volume of pigments, of cuprous oxide, and correspondingly,
  2. 10–70 percent by volume, based on the total volume of pigments, of calcium carbonate.

DESCRIPTION OF THE INVENTION

The novel coating composition of this invention has a total solids content of about 30–90 percent by weight and preferably, a solids content of about 75–85 percent by weight. The composition comprises a binder in solution and pigments uniformly dispersed in the composition. Conventional organic solvents are used in the composition.

The binder of the composition comprises 10–70 percent by weight of a chlorinated hydrocarbon rubber that has a chlorine content of 50 to 75 percent by weight and preferably 62–67 percent by weight and a viscosity of 4 to 50 centipoises determined at 25°C. on a 20 percent solids solution in toluene. One particularly preferred chlorinated natural rubber has a 64 to 65 percent chlorine content and a viscosity of 9 to 14 centipoises. Chlorinated polyisoprene rubber having the aforementioned chlorine content and viscosity can also be used. The preferred amount of chlorinated hydrocarbon rubber used in the novel composition comprises 20–50 percent by weight of the binder.

The binder comprises 30–90 percent by weight of rosin which is at least partially soluble in sea water. Typical grades of rosin that can be used are grades C, D, E, F, G, H, I, K, L, M, N, W-G (window glass) and W-W (water white). The color of the rosin determines the grade. Preferably, W-G grade rosin is used. The preferred compositions contain 45–75 percent by weight of rosin in the binder.

Up to 20 percent by weight of the binder is a plasticizer which can either by tricresyl phosphate, a chlorinated paraffin, or a phthalate ester such as dibutyl phthalate. Preferably, a plasticizer is used in the binder in amounts of 5–15 percent by weight with the preferred plasticizer being tricresyl phosphate.

The binder is in a solution of conventional aromatic or aliphatic hydrocarbon solvents. These solvents can be used in combination with conventional ketones and esters. Typical solvents are xylene, toluene, benzene, solvesso 100, methylethyl ketone, methyisobutyl ketone, cyclohexanone, butyl acetate and mixtures of these solvents.

The unique combination of cuprous oxide and calcium carbonate pigments provide the novel coating composition of this invention with its anti-fouling characteristics. These pigments are used in a pigment volume concentration of 35–55 percent. An optimum pigment volume concentration of these pigments is about 38–48 percent. These pigments are used as follows: 30–90% by volume, based on the total volume of pigments, of cuprous oxide is used in combination with 10–70 percent by volume, based on the total volume of pigments, of calcium carbonate. The preferred combination of these pigments comprises 30–70 percent by volume of cuprous oxide pigment with a corresponding amount of 70–30 percent by volume of calcium carbonate.

Other pigments can be added in small amounts to provide color to the composition, such as iron oxide, lead molybdate, ferrite and the like.

In one particularly preferred composition which provides a high quality finish, the binder is
  1. 19–21 percent by weight of chlorinated natural rubber having the aforementioned chlorine content;
  2. 68–72 percent by weight of rosin of a W-G grade; and
  3. 10–12 percent by weight of a tricresyl phosphate plasticizer. The pigment volume concentration of this composition is about 38–48 percent and the pigments are 35 percent by volume of cuprous oxide and 65 percent of volume of calcium carbonate.

Small amounts of stabilizers can be added to the novel composition to enhance the stability of the composition while in storage. For example, about 2.5–3.5 percent by volume of the total volume of pigment of zinc oxide can be used.

Dispersing aids and anti-settling agents, such as hydrogenated castor oil, a lecithin solution, linseed oil and the like, can be added in amounts of about 0.5–1.5 percent by weight, based on the weight of the pigments in the composition.

It is often preferred to add small amounts of other additives such as tributyl tin oxide or tributyl tin fluoride or a combination thereof to provide protection against a broader range of marine growth. These compositions can be added in amounts of about 2–4 percent based on the total solids of the composition.

The novel coating composition of this invention is prepared by conventional techniques in which the constituents are blended together and the pigments are dispersed by conventional means such as ball milling, sand grinding, pebble milling and the like. Preferably, a mill base is first prepared containing the pigments and small amount of the binder and then this mill base is mixed with the binder constituents to form the novel coating composition.

The novel coating composition can be applied by conventional techniques, such as spraying, brushing, roller coating, dipping, electrostatic spraying, flow coating and the like. The composition can be air dried or can be dried under accelerated conditions, such as temperatures of 30° to 45°C., e.g., 45°C. for 20 minutes.

The novel coating composition of this invention can be applied to suitably primed or unprimed metal substrates, such as primed hulls of ships, steel piers, pipes, and other metals which are exposed to sea water. The novel composition can also be used on polyester or epoxy resin reinforced fiberglas and wood. In general, the composition can be used on substrates which are exposed to marine growth to provide antifouling protection to the substrate.

The following Examples illustrate the invention. All parts and percentages are on a weight basis unless otherwise indicated.

EXAMPLE 1

The following coating compositions are prepared:

| Compound | Composition A | Composition B | Composition C |
|---|---|---|---|
| Chlorinated rubber solution (30% solids in xylene of a chlorinated rubber having a viscosity of 9–14 centipoises measured at 25°C. using a 20% solids solution in toluene and containing 64–65% by weight chlorine) | 57.2 | 57.2 | 57.2 |
| Rosin solution (60% solids solution in xylene and solvesso solvent mixture of WG grade rosin) | 112.5 | 112.5 | 112.5 |
| Linseed oil | 0.5 | 0.5 | 0.5 |
| Calcium carbonate pigment | 126.10 | — | — |
| Talc pigment | — | — | 135.0 |
| Soya lecithin solution (50% solids solution of soya lecithin in mineral spirits solvent) | 1.5 | 1.5 | 1.5 |
| Tricresyl phosphate | 11.0 | 11.0 | 11.0 |
| Cuprous oxide | 150.0 | 428.0 | 150.0 |
| Total | 458.80 | 610.7 | 467.7 |

In each of the above coating compositions A, B and C, the constituents are blended together and charged into a conventional sand mill and ground to a fineness of about 0.5–1.5 mils. Each composition has a pigment volume concentration of 43 percent. The per cent volume of pigment in each composition is as follows:

| Pigment | Composition A | Composition B | Composition C |
|---|---|---|---|
| Calcium carbonate | 65% | — | — |
| Talc | — | — | 65% |
| Cuprous oxide | 35% | 100% | 35% |

Coating Composition A represents the invention, Coating Composition B does not contain calcium carbonate extender pigment and only contains cuprous oxide pigment. Coating Composition C contains talc as an extender pigment in the same pigment volume concentration as calcium carbonate pigment in Coating Composition A.

Each of the Coating Compositions A, B and C are sprayed onto separate primed steel panels. Each of the steel panels are primed with a polyvinyl butyryl wash primer coat which is about 0.2–0.3 mils in thickness and primed with two coats of epoxy ester primer which is about 5 mils in thickness. Each of the above prepared Coating Compositions A, B and C are diluted to a spray viscosity with xylene. In each case, about 5 parts of coating composition to 1 part of xylene are used. Each of the compositions is sprayed onto the primed panel to a dry film thickness of about 2 mils and then air dried.

Each of the panels is totally immersed in Florida tidewater at Miami Beach with exposure period starting in February. Each of the panels are inspected every three months for fouling from marine growth. The following table is a summary of this test:

TABLE

| Months Exposure | Coating Composition A (65% by Volume Calcium Carbonate/35% by Volume Cuprous Oxide) | Coating Composition B (100% by Volume Cuprous Oxide) | Coating Composition C (65% by Volume Talc/ 35% by Volume Cuprous Oxide) |
|---|---|---|---|
| 3 Months | 100% Free of Fouling | 100% Free of Fouling | 100% Free of Fouling |
| 6 Months | 100% Free of Fouling | 100% Free of Fouling | 100% Free of Fouling |
| 9 Months | 95% Free of Fouling | 89% Free of Fouling | Completely Fouled |
| 12 Months | 85% Free of Fouling | 70% Free of Fouling | Completely Fouled |
| 15 Months | Completely Fouled | — | Completely Fouled |

EXAMPLE 2

The brown pigment dispersion is prepared as follows:

|  | Parts By Weight |
|---|---|
| Portion 1 |  |
| Xylene | 1073 |
| Solvesso 100 | 270 |
| Portion 2 |  |
| Rosin (WG Grade Rosin) | 1609 |
| Portion 3 |  |
| Hydrogenated Castor Oil slurry (50% solids in xylene) | 140 |
| Calcium carbonate pigment | 2673 |
| Cuprous Oxide pigment | 3574 |
| Zinc oxide pigment | 279 |
| Iron oxide pigment | 382 |
| Total | 10,000 |

Portion 1 is charged into a mixer. Portion 2 is crushed and then added to Portion 1 and mixed for four hours until dissolved. Portion 3 is added and mixed for 30 minutes and then the composition is charged into a conventional sand mill and ground at a rate of 60 gallons per hour through a 30 gallon unit maintaining the temperature at 110°–130°F. to form the pigment dispersion.

A coating composition is prepared as follows:

|  | Parts By Weight |
|---|---|
| Portion 1 |  |
| Brown Pigment Dispersion (prepared above) | 1135.80 |
| Chlorinated rubber solution (35% solids solution in xylene of the chlorinated hydrocarbon rubber described in Example 1) | 198.22 |
| Tricresyl phosphate | 34.44 |
| Tributyl tin oxide | 34.44 |
| Portion 2 |  |
| Xylene | 16.10 |
| Total | 1419.00 |

Portion 1 is charged into a mixing vessel and mixed for 1 hour and then Portion 2 is added. The resulting composition has a pigment volume concentration of about 41 percent, a solids content of about 78 percent.

The above prepared coating composition is applied as in Example 1 to the primed steel substrates described in Example 1 and is dried and forms a film of about 2 mils in thickness. The steel plates are exposed to Florida tidewater as in Example 1 giving about the same results as in Example 1. The panels are about 85 percent free of fouling after 12 months and are completely fouled after 15 months.

The invention claimed is:

1. An antifouling coating composition having a binder and pigments solids content of 30 to 90 percent by weight and a corresponding solvent content of 10 to 70 percent by weight; wherein the binder consists essentially of
    1. 10–70% by weight, based on the weight of the binder, of a chlorinated hydrocarbon rubber having a 50 to 75 percent chlorine content and a viscosity of 4 to 50 centipoises determined at 25°C. using a 20 percent solids solution in toluene;
    2. 30–90 percent by weight, based on the weight of the binder, of rosin that is at least partially soluble in sea water; and
    3. 0–20 percent by weight, based on the weight of the binder of an organic plasticizer of tricresyl phosphate, a chlorinated paraffin or a phthalate ester; and wherein the pigments are in a pigment volume concentration of 35–55 percent and consist essentially of
    1. 30–90% by volume, based on the total volume of the pigments, of cuprous oxide, and correspondingly,
    2. 10–70 percent by volume, based on the total volume of pigments, of calcium carbonate.

2. The coating composition of claim 1 in which the binder consists essentially of
    20–50 percent by weight, based on the weight of the binder, of a chlorinated hydrocarbon rubber;
    45–75 percent by weight, based on the weight of the binder, of rosin;
    5–15 percent by weight, based on the weight of the binder, of a plasticizer of tricresyl phosphate.

3. The coating composition of claim 2 in which the pigment consists essentially of
    30–70 percent by volume, based on the total volume of pigments, of cuprous oxide, and correspondingly,
    30–70 percent by volume, based on the total volume of pigments, of calcium carbonate.

4. The coating composition of claim 3 in which the chlorinated hydrocarbon rubber is chlorinated natural rubber having a chlorine content of 62–67 percent by weight.

5. The coating composition of claim 3 in which the chlorinated hydrocarbon rubber is a chlorinated polyisoprene having a chlorine content of 62–67 percent by weight.

6. The coating composition of claim 3 in which the rosin is W-G grade rosin.

7. The coating composition of claim 1 in which the binder consists essentially of
    1. 19–21 percent by weight of chlorinated natural rubber, having a 64 to 65 percent chlorine content, and a viscosity of 9 to 14 centipoises determined at 25°C. using a 20% solid solution in toluene;
    2. 68–72 percent by weight, based on the weight of the binder, of rosin of a grade of W-G;
    3. 10–12 percent by weight, based on the weight of the binder, of tricresyl phosphate; and wherein the pigments are in a pigment volume concentration of 38–48 percent and consist essentially of
    35 percent by volume, based on the total volume of pigments of cuprous oxide, and correspondingly,
    65 percent by volume, based on the total volume of pigments of calcium carbonate.

8. The coating composition of claim 1 containing in addition 2–4 percent by weight of the binder, of tributyl tin oxide or tributyl tin fluoride or mixtures thereof.

* * * * *